Feb. 21, 1939.  A. SCHEIBE  2,147,993
MEANS FOR SEPARATING GASES FROM LIQUIDS
Filed Aug. 25, 1936
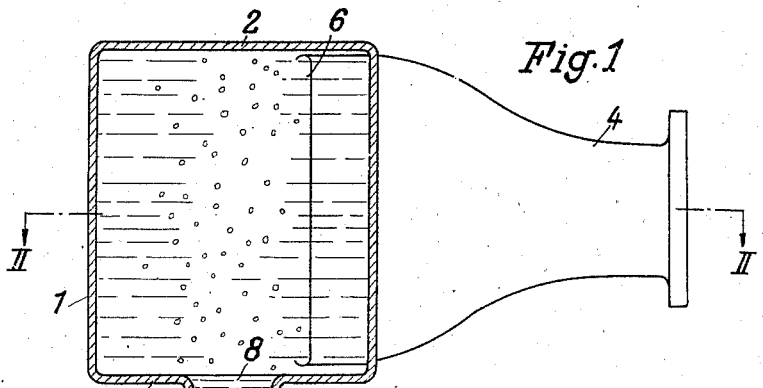
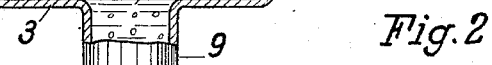
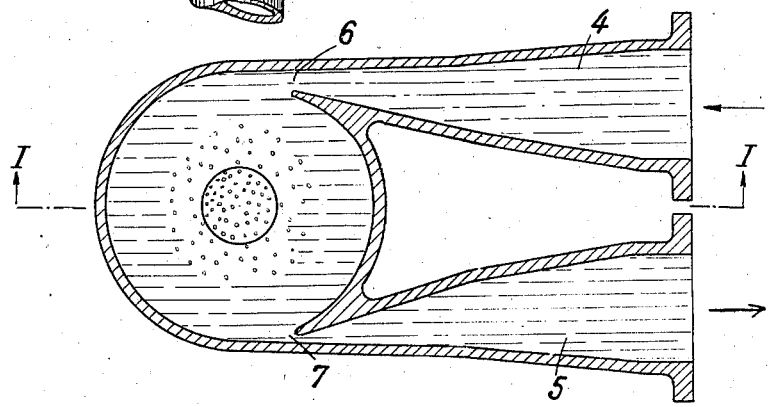
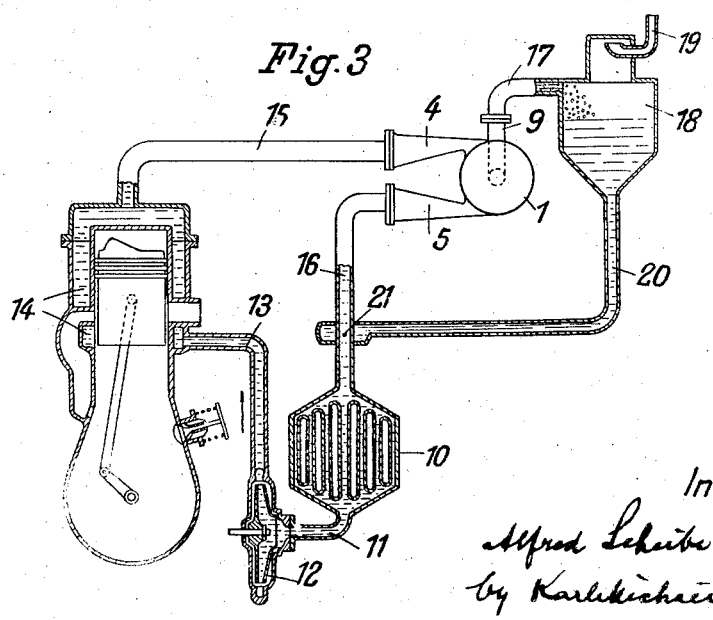
Inventor:
Alfred Scheibe Patented Feb. 21, 1939

2,147,993

UNITED STATES PATENT OFFICE 2,147,993

MEANS FOR SEPARATING GASES FROM LIQUIDS

Alfred Scheibe, Dessau-Ziebigk, Germany, assignor to Junkers Flugzeug-und-Motorenwerke Aktiengesellschaft, Dessau, Germany Application August 25, 1936, Serial No. 97,759
In Germany September 6, 1935

2 Claims. (Cl. 183—2.5)

My invention relates to means for separating gases and vapors from circulating liquids, more especially the liquids circulating in the cooling system of liquid-cooled internal combustion engines, compressors and the like.

It is an object of my invention to provide a separating device which is simple in design and operation and is more efficient than similar devices hitherto suggested.

In liquid-cooled engines and more particularly internal combustion engines, compressors and the like, the steam absorbed by the circulating cooling liquid, which has formed by local heat absorption, for instance at the cooling surfaces of the engine cylinders, and also gases or vapors which may have entered the liquid through leaks in the walls of the cooling system, for instance at the joint between the cylinders and their covers, have been separated from liquid and abducted. As a rule this separation has taken place from large free liquid surfaces by utilizing the difference in the specific gravities of liquid and steam or gas. To this end the cooling liquid leaving the engine to be cooled and having absorbed steam and gas is caused, before entering the cooler of the system, to flow in a thin layer and with low velocity over a solid surface in order to allow gas and steam bubbles to separate from the liquid. An arrangement of this kind is however very sensitive against all changes of position of the system and in consequence thereof unfit for use in cooling systems exposed to considerable changes of position, such as occur in terrestrial and aereal vehicles. Apart therefrom a system of this kind requires much space, which is a drawback in view of the little space available in vehicles.

It has also been suggested to separate gas and steam from a flowing liquid by subjecting the liquid to centrifugal action, the liquid being forced to revolve, in a vessel comprising circularly curved guide surfaces, at an angular velocity such that there is formed a rotating hollow liquid body from the inner surface of which the gases and vapors are separated out by the difference between the centrifugal forces acting on the liquid particles on the one hand and the gas particles on the other hand. In known devices of this type the admission and exhaust of the liquid are connected tangentially to the vessel, being however staggered in the direction of the axis of the vessel. In this manner a helical path of liquid flow is brought about in the vessel. Separators of this type have not been introduced into practical use, since it has been found that in the liquid flowing therein unstable eddies will arise, which sometimes lead to a remixing of the separated gases and vapors with the liquid. Therefore, a complete separation of the gases and vapors from the liquid cannot be attained with this kind of devices.

This invention has for its purpose to provide means for separating gas and steam from a liquid circulating in the cooling systems of internal combustion engines, compressors and the like, which avoids these drawbacks. The new device consists of a vessel, the inner wall surface of which is curved in a circle. The liquid admitting and exhausting means are connected tangentially to this surface, one of the end walls of the vessel is formed with a gas exhaust opening and the admission and exhaust openings for the liquid extend over a considerable portion of the length—measured in the axial direction of the vessel—of the cylindrical wall and are arranged between the same transversal planes in such manner, that in the revolving body of liquid formed in the vessel under the action of the velocity of flow of the liquid every liquid particle moves practically only in a plane normal to the axis of revolution.

In a device designed as afore described an effective separation of the gas and vapor particles to be removed is obtained in a small space. Since, in order to attain the intended effect, the velocity of flow of the liquid in the separating vessel must be chosen so high that the centrifugal force acting on the liquid exceeds the weight of the liquid, the liquid movement is stable at any position of the axis of rotation and the device is therefore insensitive against changes of its position.

In the drawing affixed to this specification and forming part thereof, a device embodying my invention is illustrated diagrammatically by way of example.

In the drawing,

Fig. 1 is an axial section on the line I—I in Fig. 2, while

Fig. 2 is a cross section on the line II—II in Fig. 1.

Fig. 3 is a diagrammatic vertical section of the circulating cooling system of an internal combustion engine with which is combined a gas and vapor separator according to this invention.

Referring to the drawing, 1 is a cylindrical vessel formed with the end walls or bottoms 2 and 3. 4 is an admission tube, 5 is an exhaust tube, both being arranged tangentially to the vessel 1 in such manner that the admission port 6 as well as the exhaust port 7 extend almost over the entire axial length of the vessel, forming comparatively narrow slot-like interruptions of the inner wall of the vessel. In the end wall 3 is formed an opening 8, to which is connected the exhaust pipe 9 for the separated gases and vapors.

The operation of this device is as follows: The liquid forced by a pump through the admission tube 4 enters the vessel at high velocity through the slot-like opening 6 in tangential direction. By reason of the narrow slot-like opening 6, the liquid under pressure passing therethrough is given a high velocity within the cylindrical vessel 1. As the centrifugal force is proportional to the square of the velocity of the liquid, a high degree of separation is obtained in the vessel between the liquid and the gas as the liquid is deviated therein by the inner wall of the vessel acting as guide, so as to be set rotating in the vessel. Through the exhaust port 7, which is preferably formed with a somewhat smaller cross-sectional area than the admission port 6, part of the liquid is exhausted, while the remainder continues revolving in contact with the circular inner wall of the vessel and on returning to the admission port 6 is accelerated anew by the entering liquid. In this manner there is formed in the vessel 1 a revolving hollow cylinder of liquid, the outer layers of which are freed from gas and steam or other vapors and which are separated from the liquid body at the exhaust slot 7 and exhausted, the cavity within the cylinder being mainly filled by the gases or vapors which were separated from the liquid in consequence of the great preponderance of the centrifugal forces of the liquid particles over the centrifugal forces of the gas and vapor particles. These gases and vapors then flow together with the liquid particles carried along by them through the opening 8 into the exhaust pipe 9.

As both the inlet opening 6 and the outlet opening 7 extend substantially the entire length of the vessel 1, and are substantially coextensive, each particle of water circulates in a plane normal to the axis of vessel 1. This prevents the formation of eddy currents within vessel 1, which currents would decrease the effective centrifugal force within vessel 1, and a consequent lessening of the degree of gas and water separation.

The cooling system of an internal combustion engine illustrated in Fig. 3 comprises a cooler 10, a return pipe 11, 13, for the cooled liquid, in which a liquid pump 12 is inserted, the cooling jacket 14 of the engine, a pipe 15, 16 leading to the cooler, for the hot liquid and the steam and vapor separating device 1 to 9 inserted therein. The admission tube 4 of the separator is connected to the pipe 15, the exhaust tube 5 to the pipe 16, while the gas and vapor exhaust pipe 9 is connected by means of a pipe 17 with the top portion, not filled with liquid, of the liquid reservoir 18.

Here the gas and vapor are separated from the liquid particles carried along by them. The gases and vapors thus separated out are exhausted into the atmosphere through a pipe 19, while the condensed liquid is directly united with the liquid in the reservoir. This latter is connected by a pipe 20 with the point 21 in the cooling system, where the liquid in the system is replenished.

If steam shall mainly be separated out from the circulating liquid, a condenser (not shown) may be inserted in the pipe 17.

I wish it to be understood that I do not desire to be limited to the exact details of construction shown and described for obvious modifications will occur to a person skilled in the art.

I claim:—

1. A liquid and gas separator for cooling systems of liquid cooled internal combustion engines comprising a hollow cylindrical vessel of substantially circular section and free from interior baffles, an inlet liquid conduit tangentially joined to said vessel, inlet orifice means of slot-like form for providing communication between said inlet conduit and said vessel and for giving liquid passing from said inlet conduit into said vessel an increase in velocity, said inlet orifice means extending substantially the entire length of said vessel parallel to the axis thereof, an outlet conduit tangentially joined to said vessel, parallel to, and on the same side of said vessel as said inlet conduit, outlet orifice means of slot-like form for providing communication between said vessel and said outlet conduit, said outlet orifice means being co-extensive with said inlet orifice means whereby liquid in said vessel revolves therein once or a plurality of times under centrifugal force and eddy currents are avoided, and gas exhaust opening means coaxial with said axis of said vessel extending from an end of said vessel.

2. A liquid and gas separator as in claim 1, said outlet orifice means being smaller in section than said inlet orifice means.

ALFRED SCHEIBE.